(12) United States Patent
Song et al.

(10) Patent No.: US 11,519,818 B2
(45) Date of Patent: Dec. 6, 2022

(54) TEST DEVICE AND TEST METHOD FOR DYNAMIC CHARACTERISTICS OF SPRING-LOADED SAFETY VALVE

(71) Applicant: DALIAN UNIVERSITY OF TECHNOLOGY, Liaoning (CN)

(72) Inventors: Xueguan Song, Liaoning (CN);
Rongyu Wang, Liaoning (CN);
Xiaomin Xiang, Liaoning (CN);
Chaoyong Zong, Liaoning (CN);
Fengjie Zheng, Liaoning (CN);
Kunpeng Li, Liaoning (CN); Wei Sun, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 325 days.

(21) Appl. No.: 16/767,418

(22) PCT Filed: Jun. 17, 2019

(86) PCT No.: PCT/CN2019/091451
§ 371 (c)(1),
(2) Date: May 27, 2020

(87) PCT Pub. No.: WO2020/052305
PCT Pub. Date: Mar. 19, 2020

(65) Prior Publication Data
US 2020/0386654 A1    Dec. 10, 2020

(30) Foreign Application Priority Data

Sep. 11, 2018 (CN) .......................... 201811053627.8

(51) Int. Cl.
*G01M 13/003* (2019.01)
*F16K 37/00* (2006.01)

(52) U.S. Cl.
CPC ....... *G01M 13/003* (2019.01); *F16K 37/0083* (2013.01); *F16K 37/0091* (2013.01)

(58) Field of Classification Search
CPC .................................................. G01M 13/003
(Continued)

(56) References Cited

FOREIGN PATENT DOCUMENTS

| CN | 205745489 U | 11/2016 |
| CN | 206638408 U | 11/2017 |

(Continued)

OTHER PUBLICATIONS

Liu et al. Translation of CN106051282A. Published Oct. 2016. Accessd Jun. 2022. (Year: 2016).*

(Continued)

*Primary Examiner* — Walter L Lindsay, Jr.
*Assistant Examiner* — Philipmarcus T Fadul
(74) *Attorney, Agent, or Firm* — Muncy, Geissler, Olds & Lowe, P.C.

(57) ABSTRACT

A test device and a test method for dynamic characteristics of a spring-loaded safety valve are mainly used for testing opening, emission and return seat characteristics of the safety valve. The air pressure stabilizer is used for stably adjusting gas pressure in a pressure vessel. The quick start and stop device is used for controlling opening and closing of the pressure vessel. The pipeline gas mass flow detecting device is used for detecting the mass flow of the gas in a pipeline. The safety valve stem displacement detecting device is used for detecting the displacement change of a safety valve stem. The acquisition system is used for collecting, processing and saving experimental data. The device of the present invention has simple structure and high precision, and provides guarantee for the test of the dynamic characteristics of the safety valve.

4 Claims, 8 Drawing Sheets

(58) Field of Classification Search
USPC .......................................................... 73/49.6
See application file for complete search history.

(56) References Cited

FOREIGN PATENT DOCUMENTS

| | | |
|---|---|---|
| CN | 108801626 A | 11/2018 |
| GB | 2548512 A | 9/2017 |
| JP | 2014-190955 A | 10/2014 |
| WO | WO-0142693 A2 * 6/2001 | ............. F16K 17/06 |

OTHER PUBLICATIONS

International Search Report (with English translation) and Written Opinion dated Sep. 26, 2018 issued in corresponding Application No. PCT/CN2019/091451.

Office Action dated May 24, 2019 issued in corresponding Chinese Application No. 201811053627.8 (with English translation).

Decision to Grant a Patent dated Jul. 4, 2019 issued in corresponding Chinese Application No. 201811053627.8 (with English translation).

* cited by examiner

TEST DEVICE AND TEST METHOD FOR DYNAMIC CHARACTERISTICS OF SPRING-LOADED SAFETY VALVE

TECHNICAL FIELD

The present invention belongs to the technical field of valve tests, and relates to a test device and a test method for dynamic characteristics of a spring-loaded safety valve.

BACKGROUND

A safety valve is essential pressure relief equipment in the fields of process industries such as boilers, nuclear power and chemical engineering. As a last barrier of a pressure-bearing system, once the pressure-bearing system has an overpressure problem, the safety valve can be opened accurately to stably emit redundant pressure in the pressure-bearing system, and can return seat in time to avoid excessive venting of the pressure in the pressure-bearing system. The most frequently-used safety valve is a spring-loaded safety valve. The spring-loaded safety valve uses the force generated by the compression of the spring to balance the pressure on a valve flap and seal a contact surface between the valve flap and a valve seat. When the inlet pressure of the safety valve is less than the setting pressure of the safety valve, the safety valve is in a closing stage. As the inlet pressure of the safety valve is gradually increased to be higher than the setting pressure of the safety valve, the spring force is insufficient to resist the inlet pressure; the valve flap begins to leave the valve seat; and the safety valve is rapidly opened and is in the emission stage. With the continuous pressure relief of the safety valve, the inlet pressure of the safety valve is gradually reduced. When the inlet pressure is less than the spring force, the valve flap begins to return seat, so that the pressure in the pressure-bearing system is maintained in a certain range.

The accurate opening, stable emission and rapid return seat of the safety valve have a great influence on the performance of the safety valve, and are of great significance to study the dynamic characteristics of the safety valve. Therefore, a test device and a test method for dynamic characteristics of the spring-loaded safety valve need to be invented.

SUMMARY

In view of the problem in the prior art, the present invention provides a test device and a test method for dynamic characteristics of a spring-loaded safety valve having simple structure, high test accuracy and abundant test functions. The present invention can well realize the test for the dynamic characteristics of a safety valve by monitoring inlet pressure of the safety valve, safety valve stein displacement, pressure in a pressure vessel and gas mass flow in a pipeline.

To achieve the above purpose, the present invention adopts the following technical solution:

A test device for dynamic characteristics of a spring-loaded safety valve comprises a gas supply device, an air pressure stabilizer, a quick start and stop device, a pipeline air pressure detecting device, a pipeline gas mass flow detecting device, a safety valve stein displacement detecting device, a safety valve system 10, a testbed 13, a pipe support device 12 and an acquisition system 51.

The gas supply device comprises a double cylinder air compressor 18, a connecting pipe A1, a gas tank 2 and a ball valve 17. The double cylinder air compressor 18 is connected with the gas tank 2 through the connecting pipe A1; and the gas tank 2 is connected with the ball valve 17 through a thread.

The air pressure stabilizer comprises a connecting pipe B19, an electric valve 3, a connecting pipe C16, a pressure vessel 15, an air pressure sensor A4, a pressure relief valve 5 and a pressure gauge 6. The left end of the connecting pipe B19 is connected with the right end of the ball valve 17 through the thread; the left end of the electric valve 3 is connected with the right end of the connecting pipe B19 through a flange; the right end of the electric valve 3 is connected with the left end of the connecting pipe C16 through the flange; all flange joints are fastened by bolts and sealed by seal rings; the right end of the connecting pipe C16 is connected with the left end of the pressure vessel 15 through the thread; the pressure relief valve 5 is connected with the air pressure sensor A4 through the thread; the air pressure sensor A4 is connected with the top end of the pressure vessel 15 through the thread; the pressure gauge 6 is connected with the pressure vessel 15 through the thread; the electric valve 3 is used for adjusting gas pressure in the pressure vessel 15; the gas pressure in the pressure vessel 15 is fed back through the air pressure sensor A4; when the gas pressure in the pressure vessel 15 is much lower than a setting pressure, the electric valve 3 is controlled to rotate by a large angle so that the gas pressure in the pressure vessel 15 is increased quickly; when the gas pressure in the air pressure sensor A4 reaches 80% of the setting pressure, the electric valve 3 is controlled to rotate by a small angle so that the gas pressure in the pressure vessel 15 is increased slowly; thus, the pressure in the pressure vessel 15 may not fluctuate greatly, thereby achieving the purpose of pressure stabilization and avoiding flutter in the test process of the dynamic characteristics of the safety valve 40.

The quick start and stop device is an electromagnetic valve 14 arranged on the right end of the pressure vessel 15 and used for controlling the outflow of gas in the pressure vessel 15. Specifically, the left end of the electromagnetic valve 14 is connected with the right end of the pressure vessel 15 through the thread; the right end of the electromagnetic valve 14 is connected with the left end of the connecting pipe D23 through the thread; when opening and emission characteristics of the safety valve 40 are tested, a PLC (programmable logic controller) system 53 issues a control signal to make the electromagnetic valve 14 operated, and the gas in the pressure vessel 15 is emitted quickly. When the return seat characteristic of the safety valve 40 is tested, the PLC system 53 stops issuing the control signal to make the electromagnetic valve 14 not operated, so that the gas in the pressure vessel 15 is not emitted. The electromagnetic valve 14 replaces the traditional manual opening ball valve. The whole process is more intelligent. In addition, the electromagnetic valve 14 is used to make the opening and closing time shorter, so that the opening and return seat characteristics of the safety valve 40 can be tested more accurately.

The pipeline air pressure detecting device includes an air pressure sensor B7 and an air pressure sensor C11 for monitoring the gas pressure change at an outlet of the pressure vessel 15 and the gas pressure change at an inlet of the safety valve system 10 in real time. Specifically, the left end of the air pressure sensor B7 is connected with the right end of the connecting pipe D23 through a screw; the right end of the air pressure sensor B7 is connected with the left end of the connecting pipe E20 through the screw; the left end of the air pressure sensor C11 is connected with the right end of the connecting pipe F21 through the screw; the right end of the air pressure sensor C11 is connected with the left end of the connecting pipe G22 through the screw; and when the pressure at the outlet of the pressure vessel 15 and at the inlet of the safety valve 40 is changed, the air pressure sensor B7 and the air pressure sensor C11 can monitor the change of the gas pressure at the two places in real time.

The pipeline gas mass flow detecting device is a gas mass flow sensor 8 for monitoring the change of the mass flow of the gas in the pipeline in real time. Specifically, the left end of the gas mass flow sensor 8 is connected with the right end of the connecting pipe E20 through the flange; the right end of the gas mass flow sensor 8 is also connected with the left end of the connecting pipe F21 through the flange; and when the mass flow of the gas in the pipeline is changed, the gas mass flow sensor 8 can monitor the change of the mass flow of the gas in the pipeline in real time.

The safety valve stein displacement detecting device is a laser displacement sensor 9 for monitoring the change of the displacement of a safety valve stein 41 in real time. Specifically, the laser displacement sensor 9 is fixed to a laser displacement sensor fixing bracket 31 through a crosshead fastening bolt A46 and a crosshead fastening bolt B48; the laser displacement sensor fixing bracket 31 is fixed to a safety valve bracket adjustment board 49 through a crosshead set screw C47; in the pressure relief process of the safety valve, the safety valve stein 41 moves up and down and the laser displacement sensor 9 can monitor the displacement change of the safety valve stein 41 in real time.

The safety valve system 10 comprises a safety valve 40, a hexagon socket bolt A39, a hexagon socket bolt B43, a connecting plate 34, a left bracket 24 and a right bracket 38. The safety valve 40 is connected with the connecting plate 34 through the hexagon socket bolt A39 and the hexagon socket bolt B43. The left bracket 24 and the right bracket 38 of the safety valve are connected through an anchor bolt and a testbed 13. The lower end of the safety valve 40 is connected with the connecting pipe G22 through the thread.

The laser displacement sensor bracket comprises the crosshead fastening bolt A46, the crosshead fastening bolt B48, the laser displacement sensor fixing bracket 31, the crosshead fastening screw C47, the laser displacement sensor bracket adjustment board 49, a crosshead set screw B32 and a crossbeam 28. Specifically, the laser displacement sensor 9 is fixed to the laser displacement sensor fixing bracket 31 through the crosshead fastening bolt A46 and the crosshead fastening bolt B48; the laser displacement sensor fixing bracket 31 is fixed to the laser displacement sensor bracket adjustment board 49 through the crosshead fastening screw C47; the laser displacement sensor fixing bracket 31 is provided with a groove-shaped hole so that the laser displacement sensor fixing bracket 31 can move left and right; the laser displacement sensor bracket adjustment board 49 is fixed to the crossbeam 28 through the crosshead set screw B32, wherein the crossbeam 28 is provided with the groove-shaped hole 50 so that the laser displacement sensor bracket adjustment board 49 can move back and forth.

The acquisition system 51 is connected with the pipeline air pressure detecting device, the pipeline gas mass flow detecting device and the safety valve stein displacement detecting device. The acquisition system 51 comprises a power module 52, a PLC system 53 and an upper computer 54. The power module 52 converts 220V voltage into 24V voltage for supplying power to the air pressure sensor A4, the air pressure sensor B7, the air pressure sensor C11, the gas mass flow sensor 8 and the laser displacement sensor 9.

The PLC system 53 is mainly used for collecting signals of the laser displacement sensor 9, the gas mass flow sensor 8, the air pressure sensor A4, the air pressure sensor B7 and the air pressure sensor C11. The PLC system 53 and the upper computer 54 conduct data transmission through RS485. The PLC system 53 not only controls the collection of the data, but also controls the opening degree of the electric valve 3 and the start/stop of the electromagnetic valve 14.

A test method for dynamic characteristics of a spring-loaded safety valve comprises the following steps:

first step: enabling the pressure in the pressure vessel 15 to reach a setting pressure: starting the system; setting the inlet pressure of the safety valve 40 to be tested; then inflating through the double cylinder air compressor 2; issuing a control signal by the PLC system 53 to maximize the opening degree of the electric valve 3; quickly inflating; judging the gas pressure in the pressure vessel 15 through the air pressure sensor A4; issuing a control signal by the PLC system 53 to reduce the opening degree of the electric valve 3 when the pressure in the pressure vessel 15 reaches 80% of the setting pressure of the test, so as to slowly inflate the pressure vessel 15 and reduce pressure fluctuation; issuing a signal by the PLC system 53 to control the shutoff of the electric valve 3 when the gas pressure in the pressure vessel 15 reaches the setting pressure; at this time, stabilizing the pressure in the pressure vessel 15 to be the setting pressure;

second step: testing accurate opening and stable emission of the safety valve 40: issuing a control signal by the PLC system 53 to control to open the electromagnetic valve 14; enabling the gas in the pressure vessel 15 to flow out and act on the safety valve 40 through the pipeline; at this time, opening the safety valve 40; gradually reducing the gas pressure in the pressure vessel 15; controlling the electric valve 3 by the PLC system 53 to continue to operate when the gas pressure in the pressure vessel 15 is lower than the setting pressure; inflating the pressure vessel 15 continuously to stabilize the gas pressure in the pressure vessel 15 to be the setting pressure; keeping the safety valve 15 in a stable emission stage; collecting the data of the sensors in the test process by the PLC system 53; processing the collected data by the upper computer 54 to obtain a curve of inlet pressure of the safety valve 40 and valve stem displacement of the safety valve 40 in the opening and emission process of the safety valve 40; and analyzing and judging whether the opening of the safety valve 40 is accurate and whether the emission process is stable;

third step: testing the rapid return seat of the safety valve 40: after the safety valve 40 is emitted for a period of time, issuing a control signal by the PLC system 53 to control to shut off the electric valve 3; gradually reducing the gas pressure in the pressure vessel 15; gradually changing the safety valve 40 from stable emission to a return seat state; collecting the data of the sensors in the test process by the PLC system 53; processing the collected data by the upper computer 54 to obtain a curve of inlet pressure of the safety valve 40 and valve stem displacement of the safety valve 40 in the return seat process of the safety valve 40; and analyzing and judging whether the return seat of the safety valve 40 is timely;

fourth step: if the test is completed, closing the system and ending the test; if the test is not completed, continuing the adjustment of the inlet pressure of the safety valve 40 and repeating the above process.

The technical solution of the present invention has the following advantages:

(1) In the test device, the air pressure sensors are installed on the pressure vessel; the electric valve is arranged on the pipeline between the gas tank and the pressure vessel; the opening degree of the electric valve is controlled through the gas pressure signals fed back by the air pressure sensors, so as to realize pressure stabilization in the pressure vessel and provide steady pressure for the test of the dynamic characteristics of the safety valve.

(2) In the test device, the electromagnetic valve is installed between the pressure vessel and the safety valve; the electromagnetic valve can be used for controlling opening and closing of the pressure vessel in the test process, so as to solve the problem of low response of a manual rotating ball valve in the traditional test process so that the whole test process is more intelligent.

(3) In the test device, the air pressure sensors are used for monitoring the inlet pressure of the safety valve, the mass flow sensor is used for monitoring mass flow of the gas in the pipeline and the laser displacement sensor is used for monitoring the displacement change of the safety valve stein, so as to well realize the test for the dynamic characteristics of the safety valve.

(4) In the test device, the PLC system is used for collecting the signals of the air pressure sensors, the gas mass flow sensor and the laser displacement sensor; the collected signals are uploaded to the upper computer through RS485 for processing, and a curve of valve stein displacement and inlet pressure of the safety valve in the test process of dynamic characteristics of the safety valve is shown in real time.

In the figures: 1 connecting pipe A; 2 gas tank; 3 electric valve; 4 air pressure sensor A; 5 pressure relief valve; 6 pressure gauge; 7 air pressure sensor B; 8 gas mass flow sensor; 9 laser displacement sensor; 10 safety valve system; 11 air pressure sensor C; 12 pipe support device; 13 testbed; 14 electromagnetic valve; 15 pressure vessel; 16 connecting pipe C; 17 ball valve; 18 double cylinder air compressor; 19 connecting pipe B; 20 connecting pipe E; 21 connecting pipe F; 22 connecting pipe G; 23 connecting pipe D; 24 left bracket; 25 left baffle; 26 set screw A; 27 flat head fastening bolt A; 28 crossbeam; 29 set screw C; 30 crosshead set screw A; 31 laser displacement sensor fixing bracket; 32 crosshead set screw B; 33 set screw D; 34 connecting plate; 35 flat head fastening bolt B; 36 set screw B; 37 right baffle; 38 right bracket; 39 hexagon socket bolt A; 40 safety valve; 41 safety valve stein; 42 aluminum rod; 43 hexagon socket bolt B; 44 transverse groove-shaped hole; 45 longitudinal groove-shaped hole; 46 crosshead fastening bolt A; 47 crosshead set screw C; 48 crosshead fastening bolt B; 49 laser displacement sensor bracket adjustment board; 50 groove-shaped hole; 51 acquisition system; 52 power module; 53 PLC system; and 54 upper computer.

DETAILED DESCRIPTION

The present invention will be described in detail below in combination with the drawings.

Figure 1:
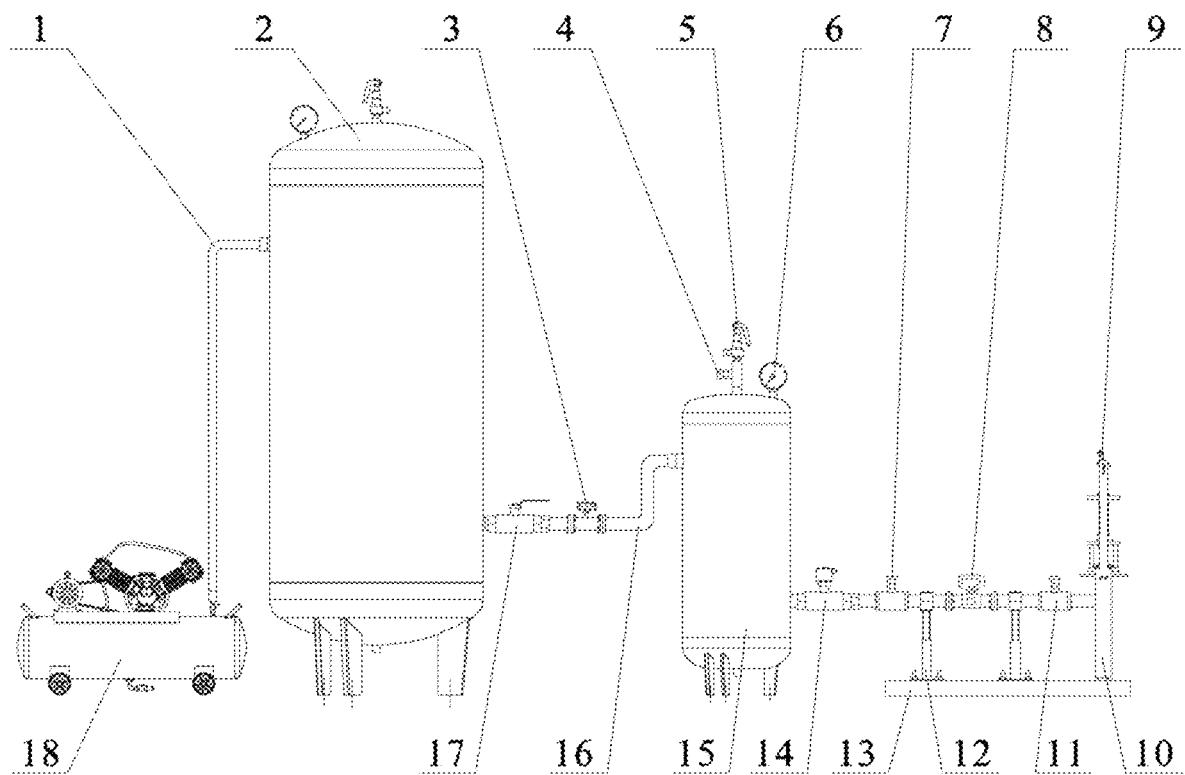
FIG. 1 is a general structural diagram of a test device for dynamic characteristics of a safety valve.
Figure 2:
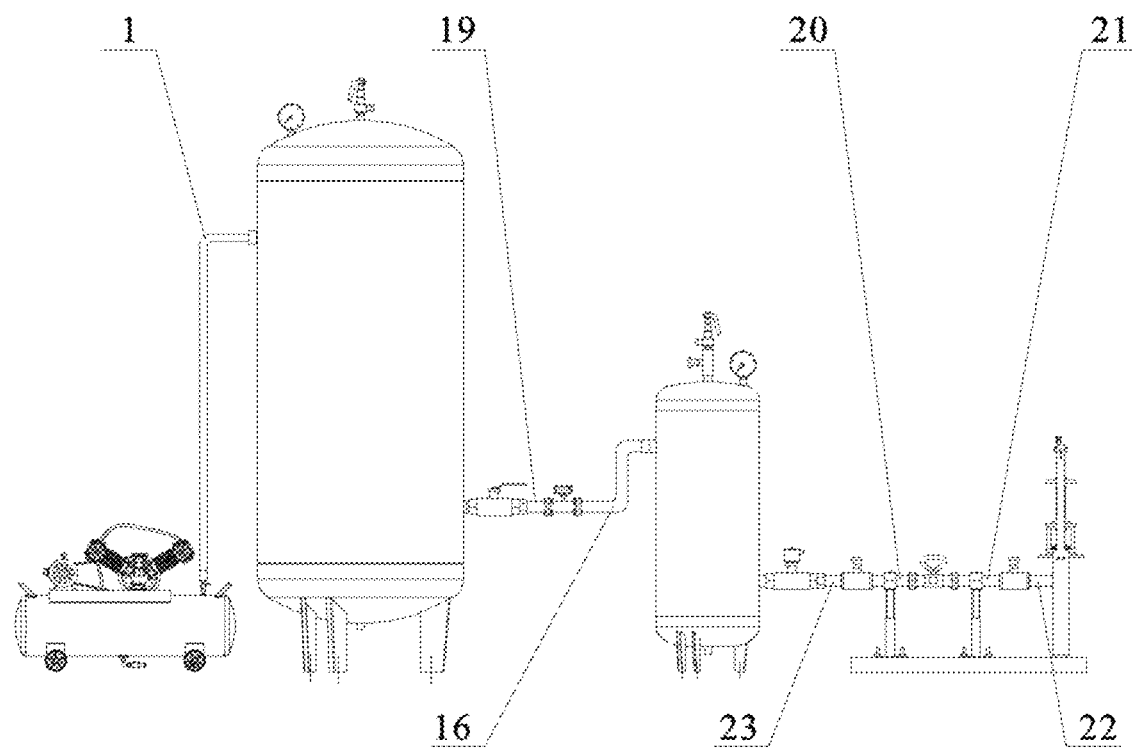
FIG. 2 is a structural diagram of a connecting pipeline of a test device for dynamic characteristics of a safety valve.

The general structure of a test device for dynamic characteristics of a safety valve is shown in FIG. 1 and FIG. 2. An air compressor 18 is connected with a gas tank 2 through a connecting pipe A1; the right end of the gas tank 2 is connected with the left end of a ball valve 17 through a thread; the right end of the ball valve 17 is connected with the left end of a connecting pipe B19 through the thread; the right end of the connecting pipe B19 is connected with the left end of an electric valve 3 through a flange and fastened by a bolt; the right end of the electric valve 3 is connected with the left end of a connecting pipe C16 through the flange and fastened by a bolt; the right end of the connecting pipe C16 is connected with the left end of the pressure vessel 15 through the thread; an air pressure sensor A4 and a pressure gauge 6 are installed on the pressure vessel 15; a pressure relief valve 5 is installed on the air pressure sensor A4; the right end of the pressure vessel 15 is connected with an electromagnetic valve 14 through the thread; the right end of the electromagnetic valve 14 is connected with a connecting pipe D23 through the thread; the right end of the connecting pipe D23 is connected with an air pressure sensor B7 through a screw; the right end of the air pressure sensor B7 is connected with the left end of a connecting pipe E20 through a screw; the middle of the connecting pipe E20 is supported through the pipe support device 12; the right end of the connecting pipe E20 is connected with the left end of a gas mass flow sensor 8 through the flange; the right end of the gas mass flow sensor 8 is connected with the left end of the connecting pipe F21 through the flange; the right end of the connecting pipe F21 is connected with the left end of an air pressure sensor C11 through a screw; the right end of the air pressure sensor C11 is connected with the left end of a connecting pipe G22 through a screw; the other end of the connecting pipe G22 is connected with an inlet of the safety valve 40 through the thread; a laser displacement sensor 9 is fixed to a safety valve system 10 through a laser displacement sensor fixing bracket 31, a laser displacement sensor bracket adjustment board 49 and a crossbeam 28.

Figure 3:
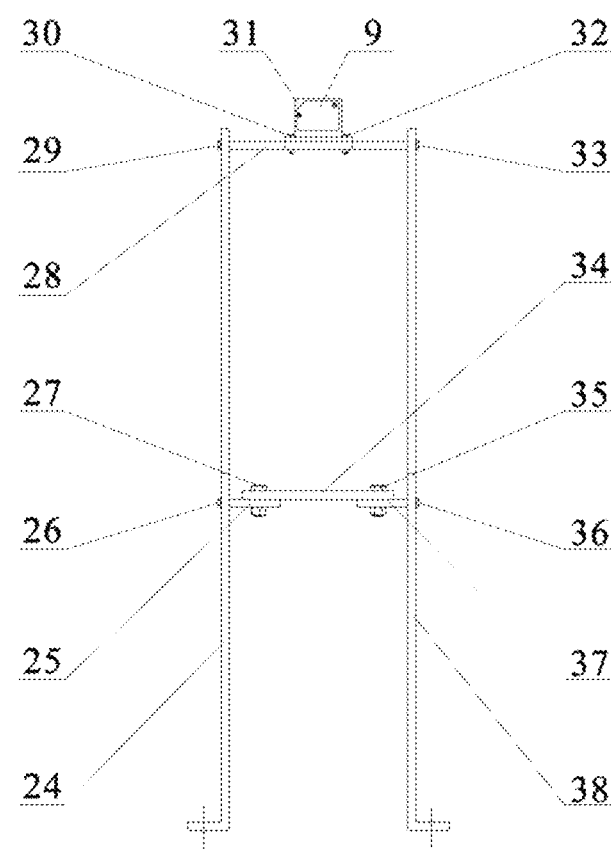
FIG. 3 is a structural diagram of a bracket of a safety valve.

The structure of a safety valve bracket is shown in FIG. 3. The left bracket 24 and a left baffle 25 are connected through a set screw A26; the connecting plate 34 and the left baffle 25 are connected through a flat head fastening bolt A27; the crossbeam 28 and the left bracket 24 are connected through a set screw C29; the laser displacement sensor fixing bracket 31 is connected with the crossbeam 28 through a crosshead set screw A30 and a crosshead set screw B32; the crossbeam 28 and the right bracket 38 are connected through a set screw D33; the connecting plate 34 and the right baffle 37 are connected through a flat head fastening bolt B35; the right bracket 38 and the right baffle 37 are connected through a set screw B36; and the left bracket 24 and the right bracket 38 are connected through an anchor bolt and a testbed 13.

Figure 4:
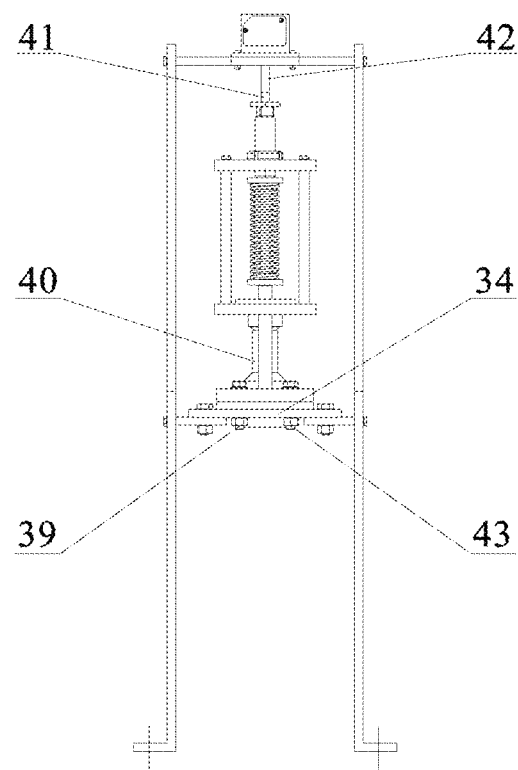
FIG. 4 is a structural diagram of connection of a safety valve and a safety valve bracket.

The structure of connection of the safety valve and the safety valve bracket is shown in FIG. 4. The safety valve 40 and the connecting plate 34 are connected through a hexagon socket bolt A39 and a hexagon socket bolt B43; an aluminum rod 42 and a safety valve stein 41 are connected through a thread; and the aluminum rod 42 can move on the safety valve stein 41 to adjust the distance between the laser displacement sensor 9 and the aluminum rod 42.

Figure 5:
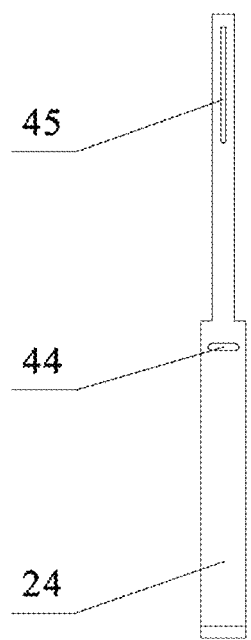
FIG. 5 is a side view of a safety valve bracket.

The side view of the safety valve bracket is shown in FIG. 5. The left bracket 24 is provided with a transverse groove-shaped hole 44 and a longitudinal groove-shaped hole 45, wherein the transverse groove-shaped hole 44 is used for left and right transverse motion of the set screw A26, and the longitudinal groove-shaped hole 45 is used for up and down longitudinal motion of the set screw C29.

Figure 6:
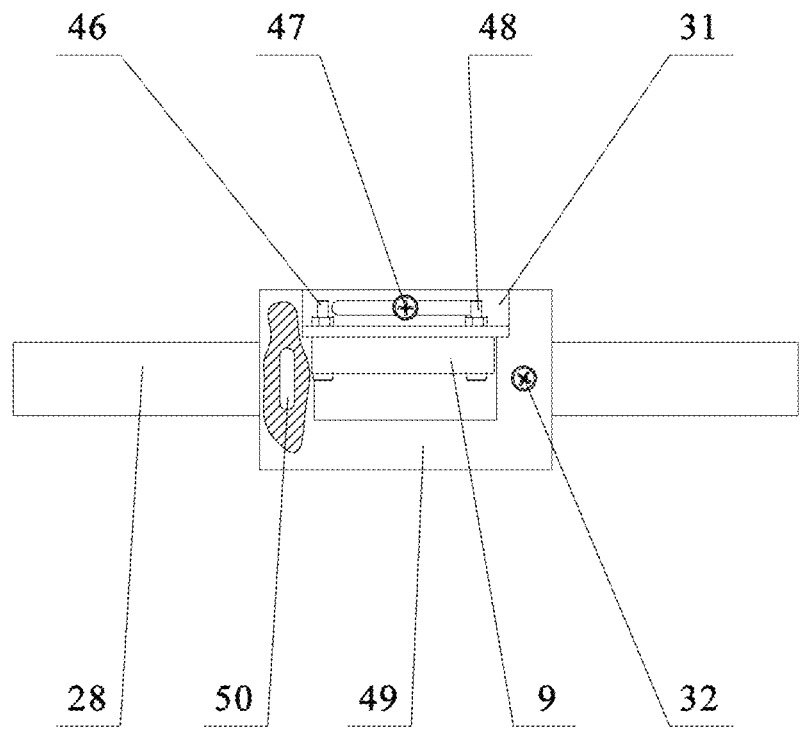
FIG. 6 is a structural diagram of a bracket of a laser displacement sensor.

The structure of the bracket of the laser displacement sensor is shown in FIG. 6. The laser displacement sensor 9 is fixed to the laser displacement sensor fixing bracket 31 through the crosshead fastening bolt A46 and the crosshead fastening bolt B48; the laser displacement sensor fixing bracket 31 is fixed to the laser displacement sensor bracket adjustment board 49 through the crosshead fastening screw C47; the laser displacement sensor fixing bracket 31 is provided with a groove-shaped hole so that the laser displacement sensor fixing bracket 31 can move left and right; the laser displacement sensor bracket adjustment board 49 is fixed to the crossbeam 28 through the crosshead set screw A30 and the crosshead set screw B32, wherein the crossbeam 28 is provided with the groove-shaped hole 50 so that the laser displacement sensor bracket adjustment board 49 can move back and forth.

Figure 7:
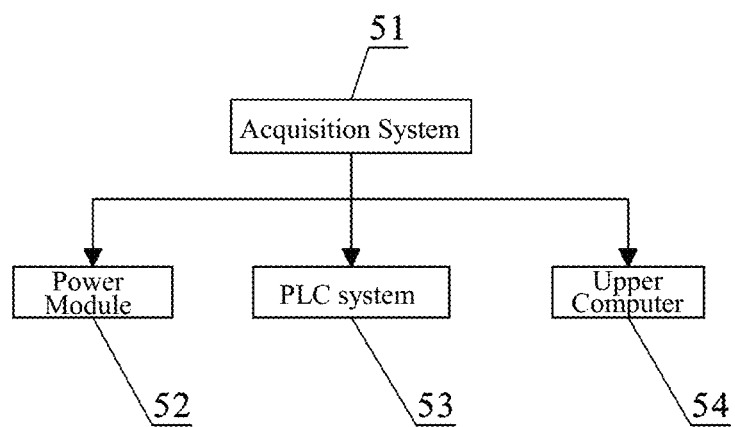
FIG. 7 is a structural schematic diagram of an acquisition system.

The structural schematic diagram of the acquisition system 51 is shown in FIG. 7. The acquisition system 51 comprises a power module 52, a PLC system 53 and an upper computer 54. The power module 52 mainly supplies power to the air pressure sensor A4, the air pressure sensor B7, the air pressure sensor C11, the gas mass flow sensor 8 and the laser displacement sensor 9. The PLC system 53 is mainly used for collecting signals of the laser displacement sensor 9, the gas mass flow sensor 8, the air pressure sensor A4, the air pressure sensor B7 and the air pressure sensor C11. The PLC system 53 uploads the collected signals of the sensors to the upper computer through RS485. The PLC system 53 can also be used for controlling the opening degree of the electric valve 3 and the start/stop of the electromagnetic valve 14.

Figure 8:
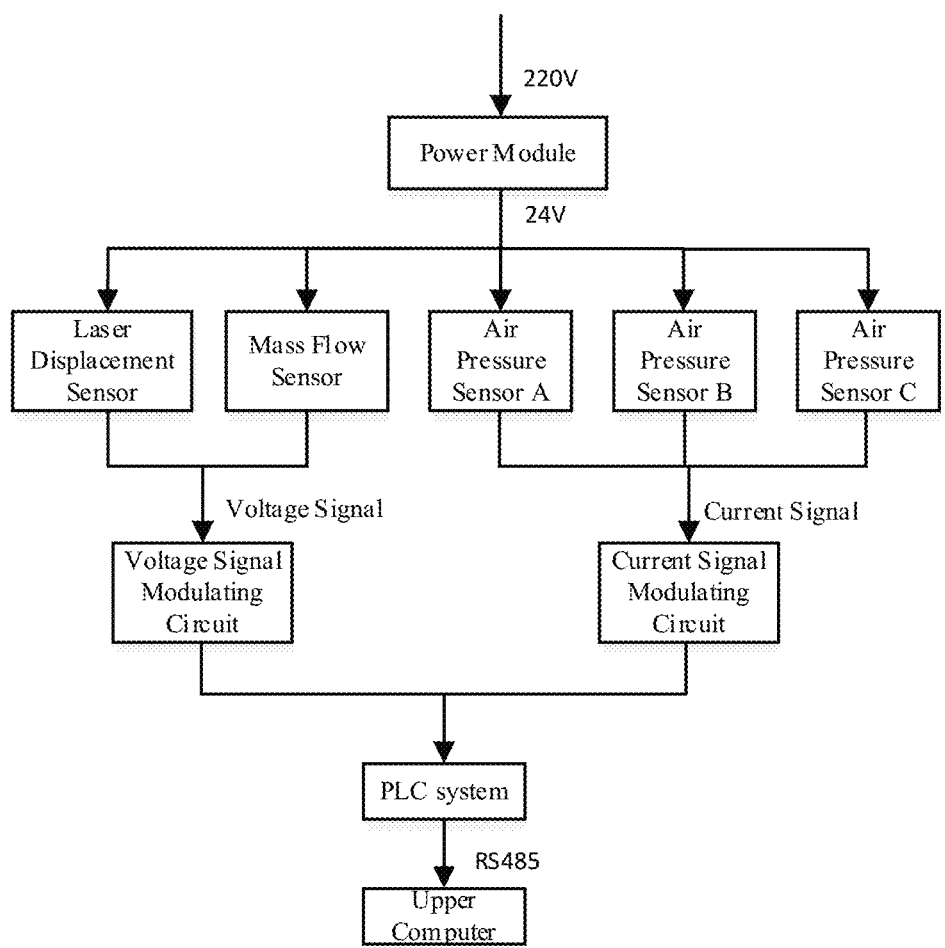
FIG. 8 is a flow chart of a signal of an acquisition system.

The flow chart of the signal of the acquisition system 51 is shown in FIG. 8. 220V power voltage is converted into 24V through the power module 52; the 24V voltage supplies power to the laser displacement sensor 9, the gas mass flow sensor 8, the air pressure sensor A4, the air pressure sensor B7 and the air pressure sensor C11; voltage signals of the laser displacement sensor 9 and the gas mass flow sensor 8 are processed by a voltage signal modulating circuit and then transmitted to the PLC system; current signals of the air pressure sensor A4, the air pressure sensor B7 and the air pressure sensor C11 are processed by a current signal modulating circuit and then transmitted to the PLC system; and the PLC system transmits the data to the upper computer through RS485.

Figure 9:
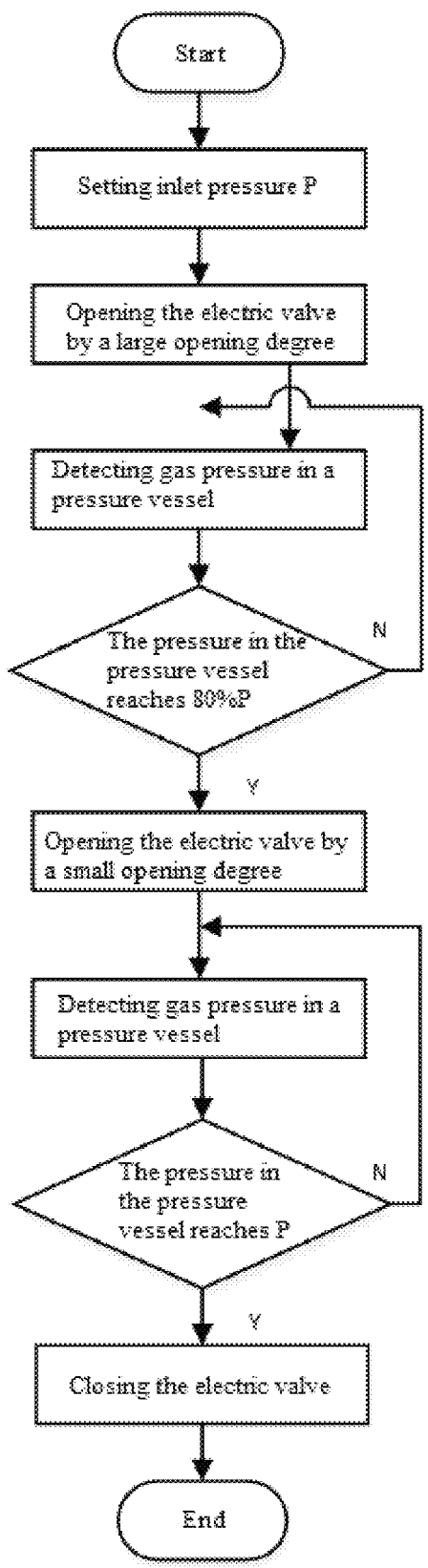
FIG. 9 is a flow chart of a pressure stabilization process of a pressure vessel before a safety valve is opened.

The flow chart of a pressure stabilization process of the pressure vessel 15 before the safety valve 40 is subjected to pressure relief is shown in FIG. 9. Firstly, the inlet pressure of the safety valve 40 is set; then, the PLC system 53 controls the electric valve 3 to be opened by a large opening degree; gas pressure in the pressure vessel 15 is detected; it is judged whether the gas pressure in the pressure vessel 15 reaches 80% of the setting pressure; if not, the gas pressure in the pressure vessel 15 is detected continuously; if the gas pressure in the pressure vessel 15 reaches 80% of the setting pressure, the PLC system 53 controls the electric valve 3 to be opened by a small opening degree. The gas pressure in the pressure vessel 15 is detected continuously; it is judged whether the pressure in the pressure vessel 15 reaches the setting pressure; if so, the electric valve 3 is turned off; if not, the gas pressure in the pressure vessel 15 is detected continuously.

Figure 10:
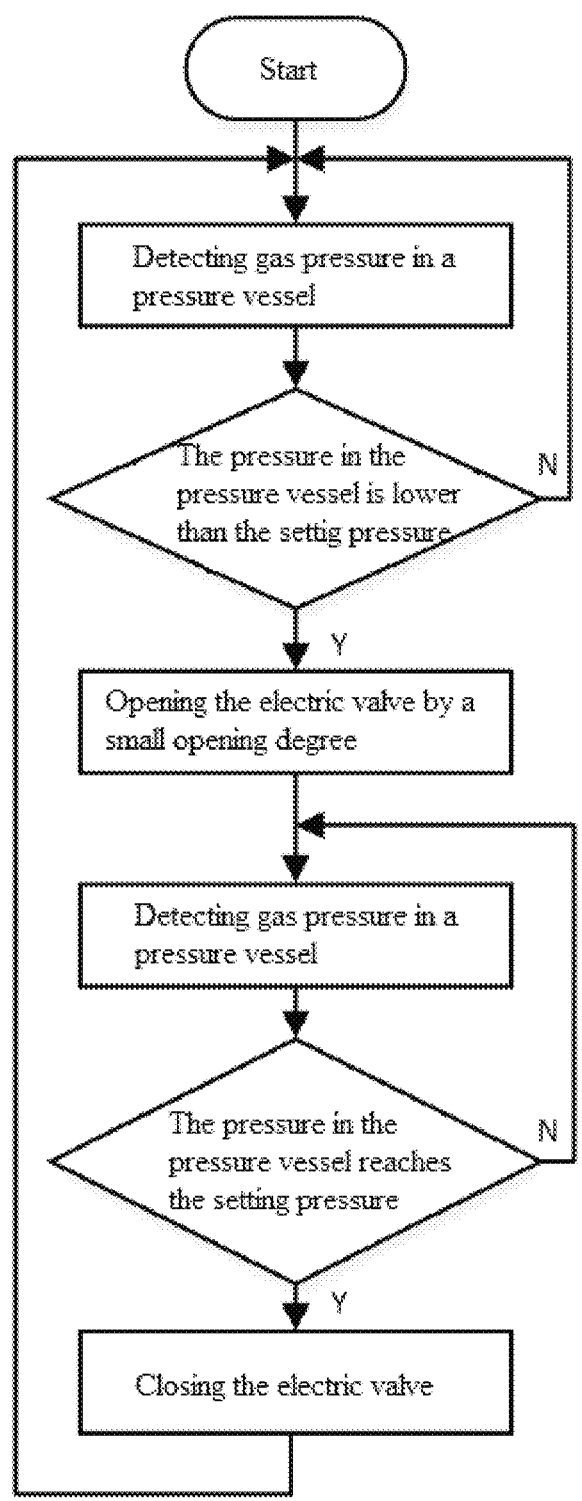
FIG. 10 is a flow chart of a pressure stabilization process of a pressure vessel in an emission process of a safety valve.

The flow chart of a pressure stabilization process of the pressure vessel 15 in the pressure relief process of the safety valve 40 is shown in FIG. 10. Firstly, the gas pressure in the pressure vessel 15 is detected; it is judged whether the pressure in the pressure vessel 15 is lower than the setting pressure; if not, the gas pressure in the pressure vessel 15 is detected continuously; if so, the PLC system 53 controls the electric valve 3 to be opened by a small opening degree; then, the gas pressure in the pressure vessel 15 is detected continuously until the pressure in the pressure vessel 15 reaches the setting pressure; the electric valve 3 is turned off; and the above process is repeated.

Figure 11:
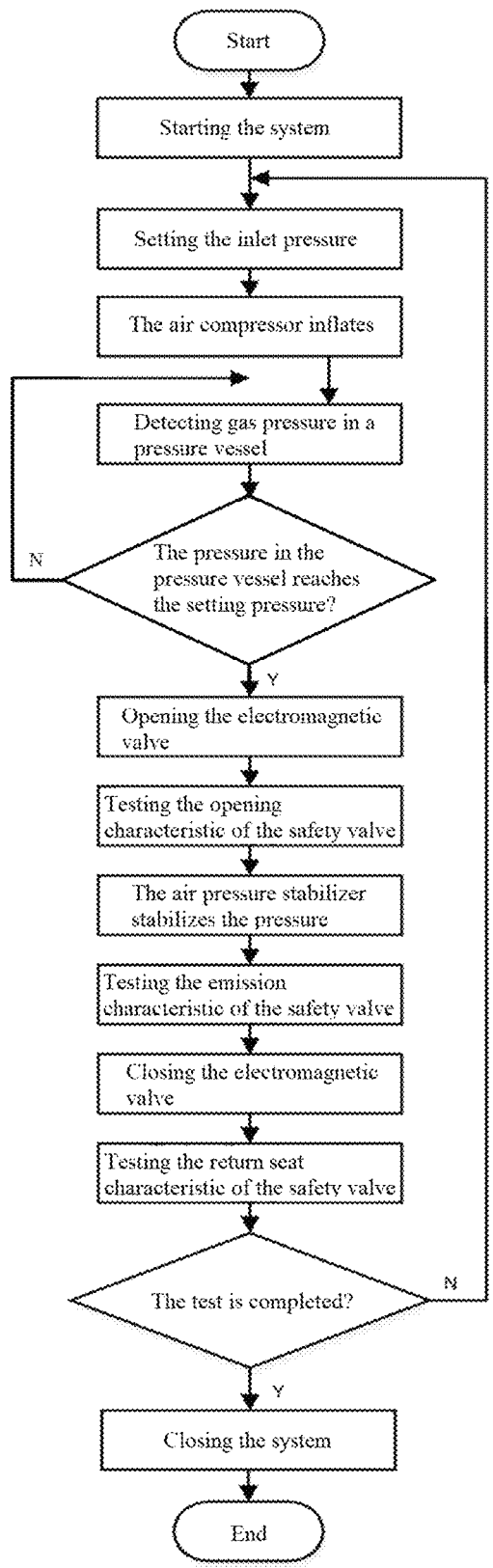
FIG. 11 is a flow chart of a working process of a test device for dynamic characteristics of a safety valve.

The flow chart of a working process of the test device for dynamic characteristics of the safety valve 40 is shown in FIG. 11. Firstly, the system is started; the inlet pressure of the safety valve 40 is set; then, the air compressor 18 inflates; the gas pressure in the pressure vessel 15 is detected; and it is judged whether the pressure in the pressure vessel 15 reaches the setting pressure. If not, the gas pressure in the pressure vessel 15 is detected continuously; if so, the PLC system 53 controls the electromagnetic valve 14 to be opened; the PLC system 53 collects the data of the sensors in the opening process of the safety valve 40; and it is tested whether the safety valve 40 is opened accurately. At this time, the air pressure stabilizer stabilizes the pressure of the pressure vessel 15. The PLC system 53 collects the data of the sensors in the emission process of the safety valve 40; and it is tested whether the safety valve 40 is emitted stably. After the safety valve 40 is emitted for a period of time, the PLC system 53 issues a control signal to turn off the electromagnetic valve 14. The PLC system 53 collects the data of the sensors in the return seat process of the safety valve 40; and it is tested whether the safety valve 40 returns seat in time. It is judged whether the test is completed. If the test is completed, the system is closed; if the test is not completed, the above process is repeated and the inlet pressures of different safety valves 40 are set continuously.

This description is merely the enumeration of the implementation forms of the technical solutions. The protection scope of the present invention shall not be limited to the specific forms described in the embodiments, but shall also involve the equivalent technical means that can be contemplated by those skilled in the art according to the technical solutions.

The invention claimed is:

1. A test device for dynamic characteristics of a spring-loaded safety valve, comprising a gas supply device, an air pressure stabilizer, a quick start and stop device, a pipeline air pressure detecting device, a pipeline gas mass flow detecting device, a laser displacement sensor bracket, a safety valve stem displacement detecting device, a safety valve system, a testbed, a pipe support device and an acquisition system, wherein a gas tank in the gas supply device is connected with a ball valve and a double cylinder air compressor;

the air pressure stabilizer comprises a connecting pipe, an electric valve, a connecting pipe, a pressure vessel, a first air pressure sensor, a pressure relief valve and a pressure gauge; one end of the connecting pipe is connected with the ball valve, and the other end is connected with the connecting pipe through the electric valve; the connecting pipe is connected with one end of the pressure vessel; a pressure gauge and the first air pressure sensor are installed above the pressure vessel; a pressure relief valve is installed above the first air pressure sensor; the first air pressure sensor feeds back the gas pressure in the pressure vessel, and adjusts the gas pressure in the pressure vessel through the electric valve to achieve the purpose of pressure stabilization;

the quick start and stop device is an electromagnetic valve arranged on the other end of the pressure vessel and used for controlling the outflow of gas in the pressure vessel;

the pipeline air pressure detecting device comprises a second air pressure sensor and a third air pressure sensor; the second air pressure sensor is connected with the electromagnetic valve through a connecting pipe; the third air pressure sensor is connected with the safety valve through a connecting pipe; the second air pressure sensor and the third air pressure sensor are used for monitoring the gas pressure change at an outlet of the pressure vessel and the gas pressure change at an inlet of the safety valve system in real time; two air pressure sensors are connected through a pipeline, and the pipeline there between is provided with a pipeline gas mass flow detecting device; the pipeline gas mass flow detecting device is a gas mass flow sensor for monitoring the change of the mass flow of the gas in the pipeline in real time;

the safety valve system comprises a safety valve, a connecting plate, a left bracket and a right bracket; the safety valve is connected with the connecting plate; the left bracket and the right bracket of the safety valve are connected through an anchor bolt and a testbed; the lower end of the safety valve is connected with the connecting pipe through a thread;

the laser displacement sensor bracket comprises a laser displacement sensor fixing bracket, a laser displacement sensor bracket adjustment board and a crossbeam; the laser displacement sensor is fixed to the laser displacement sensor bracket adjustment board through the laser displacement sensor fixing bracket; the laser displacement sensor fixing bracket is provided with a groove-shaped hole so that the laser displacement sensor fixing bracket can move left and right; the laser displacement sensor bracket adjustment board is fixed to the crossbeam, and the crossbeam is provided with the groove-shaped hole so that the laser displacement sensor bracket adjustment board can move back and forth;

the safety valve stem displacement detecting device is the laser displacement sensor, and is fixed to the laser displacement sensor bracket adjustment board through the laser displacement sensor fixing bracket in a pressure relief process of the safety valve, a safety valve stem moves up and down, and the laser displacement sensor can monitor the displacement change of the safety valve stem in real time;

the acquisition system is connected with the pipeline air pressure detecting device, the pipeline gas mass flow detecting device and the safety valve stem displacement detecting device, and comprises a power module, a programmable logic circuit (PLC) system and an upper computer; the power module is used for supplying power to the first air pressure sensor, the second air pressure sensor, the third air pressure sensor, the gas mass flow sensor and the laser displacement sensor; the PLC system is used for collecting signals of the laser displacement sensor, the gas mass flow sensor, the air pressure sensor, the air pressure sensor and the air pressure sensor, and transmitting information to the upper computer; in addition, the PLC system can also control the opening degree of the electric valve and the start/stop of the electromagnetic valve.

2. The test device for dynamic characteristics of a spring-loaded safety valve according to claim 1, wherein when the gas pressure in the pressure vessel is much lower than a setting pressure, the electric valve is controlled by the PLC system so that the gas pressure in the pressure vessel is increased quickly; when the gas pressure detected by the first air pressure sensor reaches 80% of the setting pressure, the electric valve is controlled by the PLC system so that the gas pressure in the pressure vessel is increased slowly, to ensure that the pressure in the pressure vessel may not fluctuate greatly, thereby achieving the purpose of pressure stabilization and further avoiding flutter in the test process of the safety valve.

3. The test device for dynamic characteristics of a spring-loaded safety valve according to claim 1, wherein the electromagnetic valve controls the outflow of gas in the pressure vessel; specifically, one end of the electromagnetic valve is connected with the other end of the pressure vessel; the other end of the electromagnetic valve is connected with the connecting pipe; in the test process, when the opening characteristic of the safety valve is tested, the PLC system issues a control signal to operate the electromagnetic valve and the gas in the pressure vessel is quickly emitted; when the return seat characteristic of the safety valve is tested, the PLC system stops issuing the control signal to make the electromagnetic valve not operated, so that the gas in the pressure vessel is not emitted; the electromagnetic valve replaces the traditional manual opening ball valve so that the opening and return seat characteristics of the safety valve can be tested accurately.

4. A test method for dynamic characteristics of a spring-loaded safety valve by using the test device of claim 1, comprising the following steps:

first step: enabling the pressure in the pressure vessel to reach a setting pressure starting the system; setting the inlet pressure of the safety valve to be tested; then inflating through the double cylinder air compressor; issuing a control signal by the PLC system to maximize the opening degree of the electric valve; quickly inflating; judging the gas pressure in the pressure vessel through the first air pressure sensor; issuing a control signal by the PLC system to reduce the opening degree of the electric valve when the pressure in the pressure vessel reaches 80% of the setting pressure of the test, so as to slowly inflate the pressure vessel and reduce pressure fluctuation; issuing a signal by the PLC system to control the shutoff of the electric valve when the gas pressure in the pressure vessel reaches the setting pressure; at this time, stabilizing the pressure in the pressure vessel to be the setting pressure;

second step: testing accurate opening and stable emission of the safety valve issuing a control signal by the PLC system to control to open the electromagnetic valve; enabling the gas in the pressure vessel to flow out and act on the safety valve through the pipeline; at this time, opening the safety valve; gradually reducing the gas pressure in the pressure vessel; controlling the electric valve by the PLC system to continue to operate when the gas pressure in the pressure vessel is lower than the setting pressure; inflating the pressure vessel continuously to stabilize the gas pressure in the pressure vessel to be the setting pressure;

keeping the safety valve in a stable emission stage; collecting the data of the sensors in the test process by the PLC system; processing the collected data by the upper computer to obtain a curve of inlet pressure of the safety valve and valve stem displacement of the safety valve in the opening and emission process of the safety valve; and analyzing and judging whether the opening of the safety valve is accurate and whether the emission process is stable;

third step: testing the rapid return seat of the safety valve after the safety valve is emitted, issuing a control signal by the PLC system to control to shut off the electric valve; gradually reducing the gas pressure in the pressure vessel; gradually changing the safety valve from stable emission to a return seat state; collecting the data of the sensors in the test process by the PLC system; processing the collected data by the upper computer to obtain a curve of inlet pressure of the safety valve and valve stem displacement of the safety valve in the return seat process of the safety valve; and analyzing and judging whether the return seat of the safety valve is timely;

fourth step: if the test is completed, closing the system and ending the test; if the test is not completed, continuing the adjustment of the inlet pressure of the safety valve and repeating the above process.

* * * * *